US012699182B2

(12) United States Patent
Takamura

(10) Patent No.: US 12,699,182 B2
(45) Date of Patent: Aug. 4, 2026

(54) SIGNAL PROCESSING DEVICE, SOUND WAVE SYSTEM, AND VEHICLE

(71) Applicant: ROHM CO., LTD., Kyoto (JP)

(72) Inventor: Shogo Takamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 190 days.

(21) Appl. No.: 18/428,490

(22) Filed: Jan. 31, 2024

(65) Prior Publication Data

US 2024/0241251 A1 Jul. 18, 2024

Related U.S. Application Data

(63) Continuation of application No. PCT/JP2022/025242, filed on Jun. 24, 2022.

(30) Foreign Application Priority Data

Aug. 25, 2021 (JP) ................................. 2021-136764

(51) Int. Cl.
  *G01S 15/931* (2020.01)
  *G01S 7/527* (2006.01)
  *G01S 15/10* (2006.01)
(52) U.S. Cl.
  CPC .......... *G01S 15/108* (2013.01); *G01S 7/5273* (2013.01); *G01S 15/104* (2013.01); *G01S 15/931* (2013.01)
(58) Field of Classification Search
  CPC ........ G01S 7/526; G01S 15/10; G01S 15/931; G01S 15/104; G01S 7/5273; G01S 7/524; G01S 15/108
  See application file for complete search history.

(56) References Cited

U.S. PATENT DOCUMENTS 10,054,683 B2 * 8/2018 Matsuura ................ G01S 7/536
2014/0043940 A1 * 2/2014 Niwa .................... B06B 1/0215
  367/87

(Continued)

FOREIGN PATENT DOCUMENTS

| JP | 2014-035323 | 2/2014 |
| JP | 2016-125987 | 7/2016 |
| JP | 2020-148701 | 9/2020 |

OTHER PUBLICATIONS

International Search Report and Written Opinion in International Appln. No. PCT/JP2022/025242, mailed on Aug. 9, 2022, 16 pages (with machine translation).

(Continued)

*Primary Examiner* — Abdallah Abulaban
*Assistant Examiner* — Amie M Ndure
(74) *Attorney, Agent, or Firm* — Fish & Richardson P.C.

(57) ABSTRACT

A signal processing device includes a wave-transmission signal generator configured to generate a wave-transmission signal for wave transmission of a sound wave, a wave-reception signal output unit configured to output a wave-reception signal based on wave reception of a sound wave, and a reflected-wave detection unit configured to detect, based on the wave-reception signal, a reflected wave of the wave transmission that may be included in the wave reception. The wave-transmission signal includes a first signal having a first predetermined number of waves, and a second signal generated after the first signal and having a second predetermined number of waves, the second predetermined number being smaller than the first predetermined number.

12 Claims, 8 Drawing Sheets

(56)                    References Cited

U.S. PATENT DOCUMENTS

2017/0299720 A1 * 10/2017 Matsuura ............. G01S 15/931
2020/0233071 A1 * 7/2020 Hustava ............. G01S 7/52004

OTHER PUBLICATIONS

JP OA—apanese Patent Office, Office Action in Japanese Appln. No. 2023-543721, dated Dec. 9, 2025, 8 pages (with English translation).

* cited by examiner

TW  RVB

RW

ENVELOPE OF ABSOLUTE VALUE
OF WAVE-RECEPTION SIGNAL

THRESHOLD VALUE FOR
DETECTION OF REFLECTED WAVE

SIGNAL PROCESSING DEVICE, SOUND WAVE SYSTEM, AND VEHICLE

CROSS-REFERENCE TO RELATED APPLICATIONS

This nonprovisional application is a continuation application of International Patent Application No. PCT/JP2022/025242 filed on Jun. 24, 2022, which claims priority Japanese Patent Application No. 2021-136764 filed in Japan on Aug. 25, 2021, the entire contents of which are hereby incorporated by reference.

BACKGROUND OF THE INVENTION

1. Technical Field

The invention disclosed herein relates to a signal processing device that processes a wave-transmission signal that is for wave transmission of a sound wave and a wave-reception signal that is based on wave reception of a sound wave, to a sound wave system including the signal processing device, and to a vehicle including the sound wave system.

2. Description of Related Art

Conventionally, there is known an ultrasonic system that determines a distance to a target object (an obstacle) by generating an ultrasonic wave and measuring the TOF (Time Of Flight) taken until a reflected wave of the ultrasonic wave returns. Such an ultrasonic system is often installed in a vehicle, and one of its known examples is a clearance sonar for use in vehicles.

DESCRIPTION OF EMBODIMENTS

Hereinafter, an embodiment will be described with reference to the accompanying drawings. Note that an ultrasonic system according to the embodiment described below is designed to be installed in a vehicle as an example, and can be used to implement an alarm function, an automatic braking function, an automatic parking function, and the like, which are achieved by determining a distance between the vehicle and a target object.

Ultrasonic System

Figure 1:
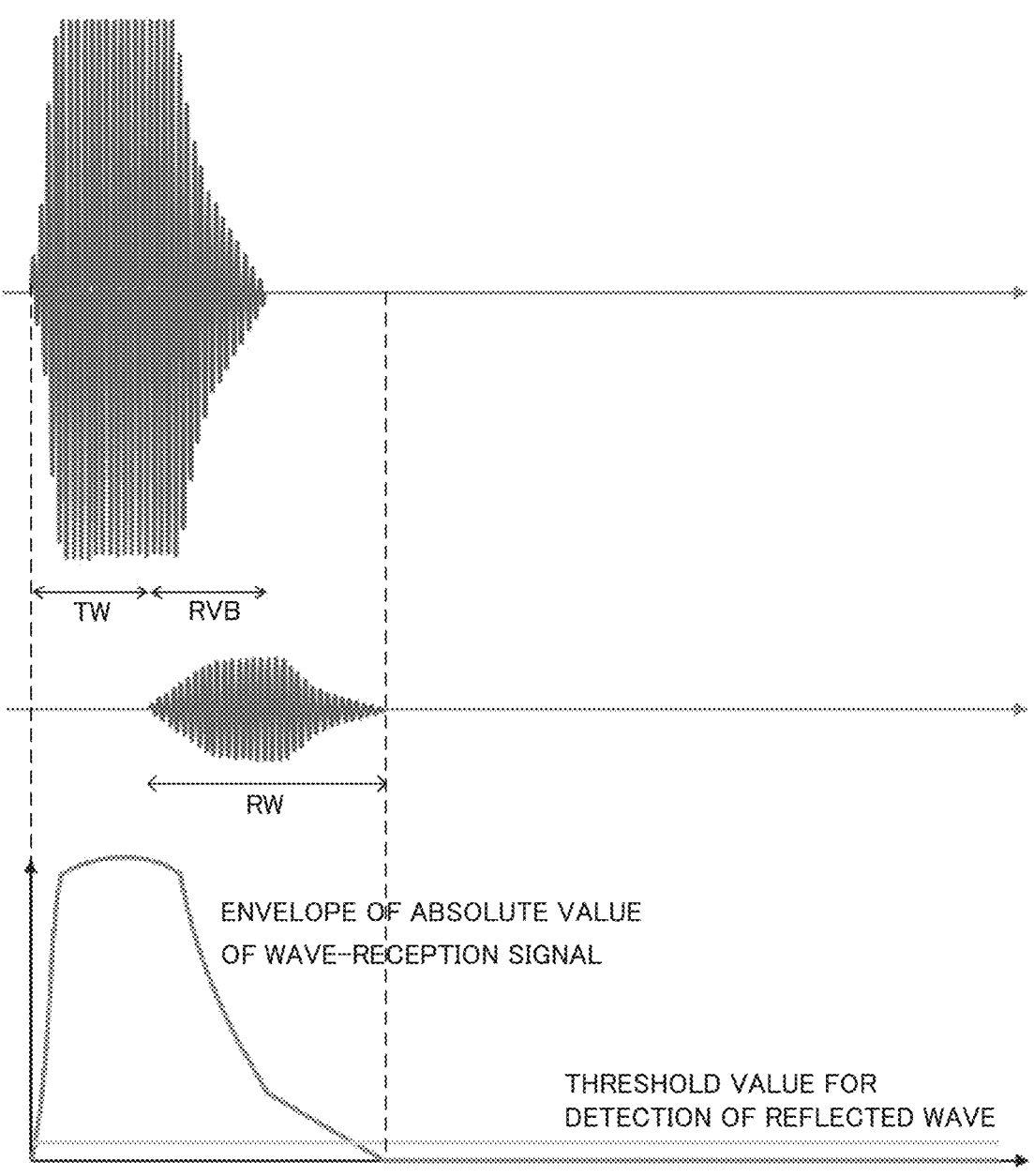
FIG. 1 is a time chart showing wave transmission, reverberation, and wave reception in a case where the power of the wave transmission is large.
Figure 2:
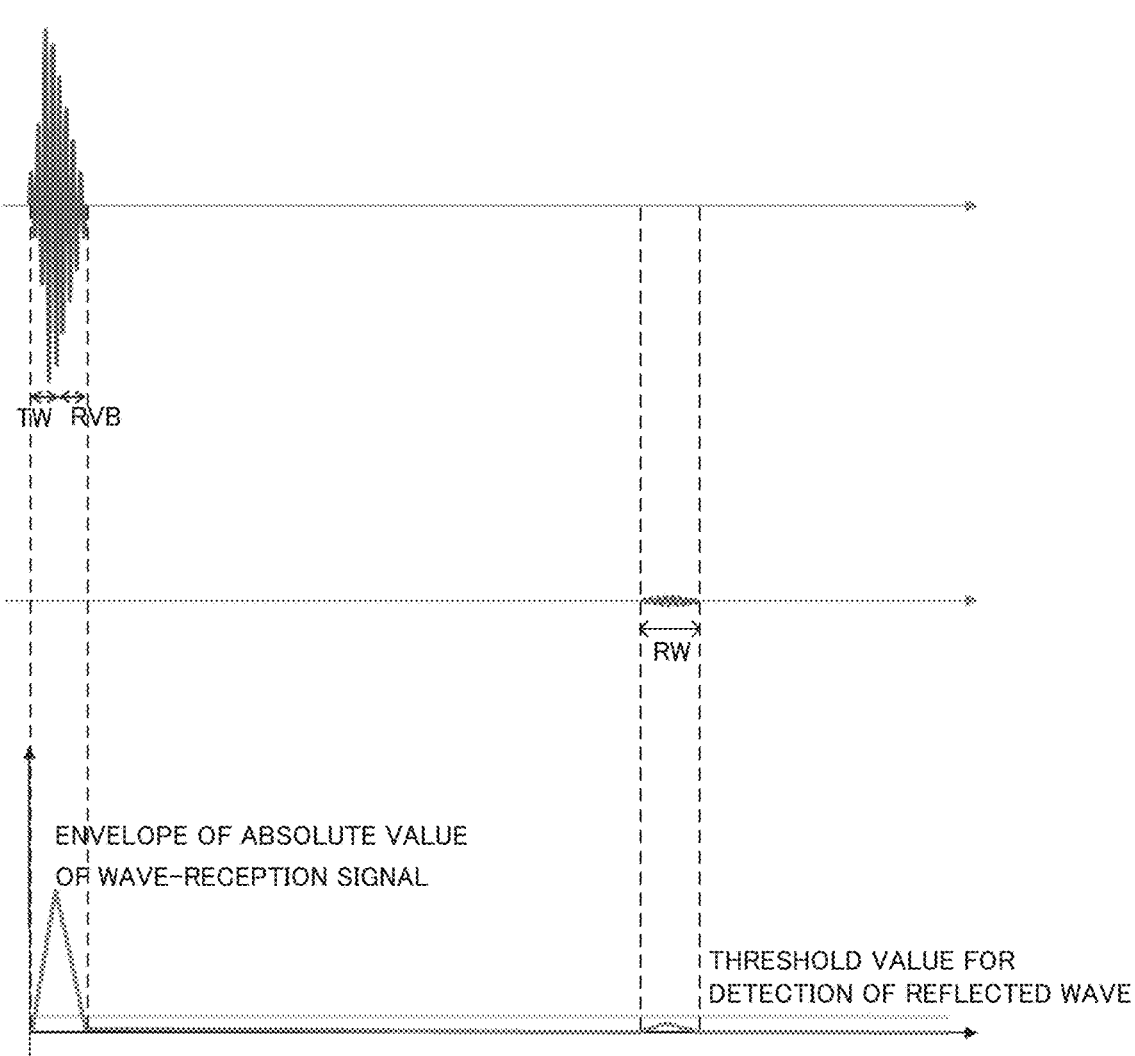
FIG. 2 is a time chart showing wave transmission, reverberation, and wave reception in a case where the power of the wave transmission is small.
Figure 3:
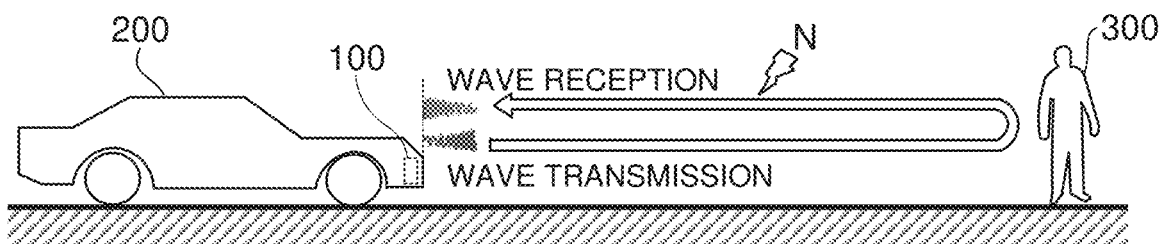
FIG. 3 is a diagram schematically showing a vehicle, in which an ultrasonic system according to an embodiment is installed, and a target object.

FIG. 3 shows a vehicle 200 having installed therein an ultrasonic system 100 (hereinafter, referred to as "the ultrasonic systems 100") according to the embodiment, and a target object (an obstacle) 300. An ultrasonic wave transmitted from the ultrasonic system 100 is reflected from the target object 300 to be received as a reflected wave by the ultrasonic system 100. At this time, the ultrasonic system 100 also receives environmental noise N.

Figure 4:
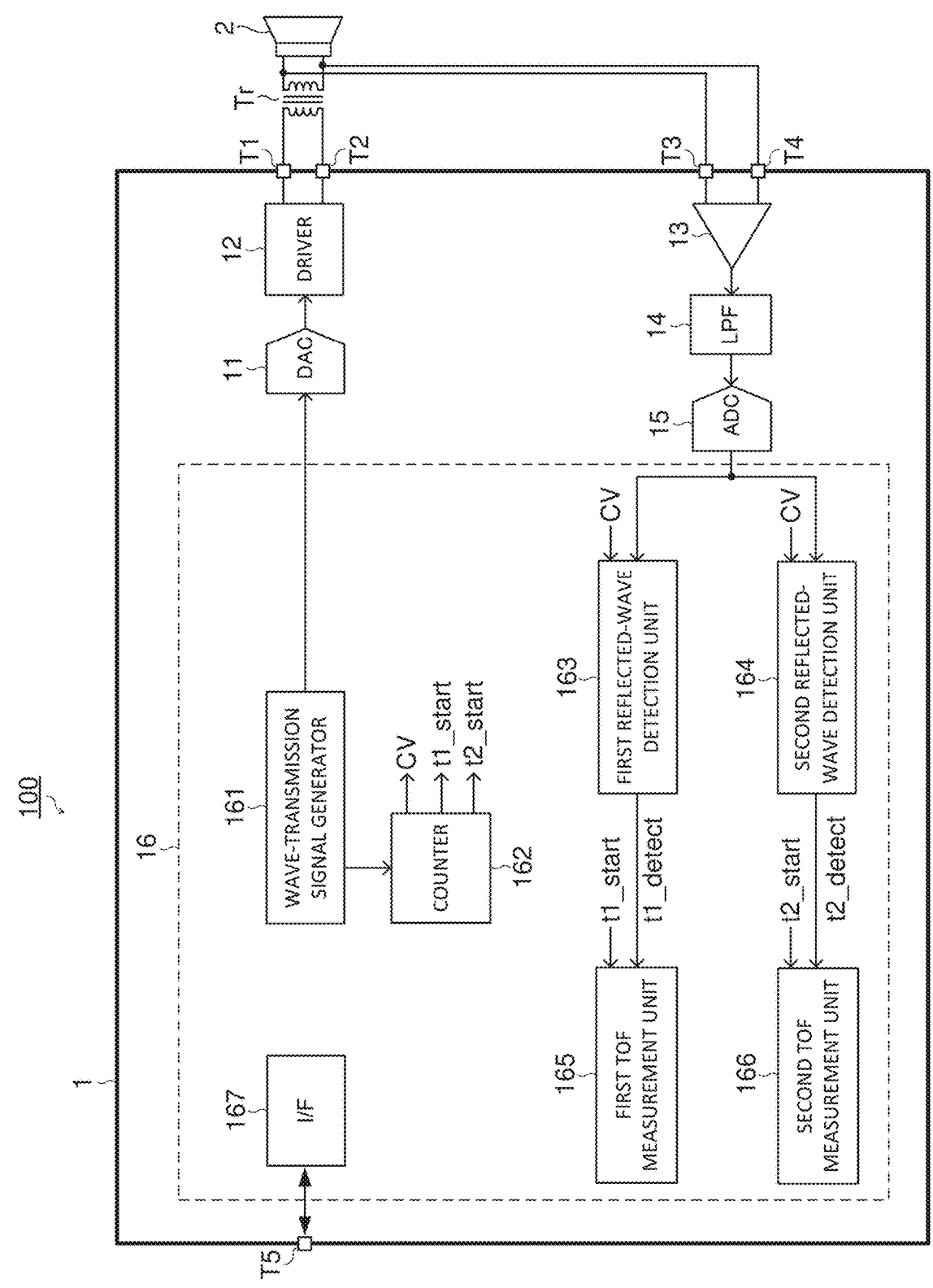
FIG. 4 is a diagram showing a configuration of the ultrasonic system according to the embodiment.

The ultrasonic system 100 will be described. FIG. 4 is a diagram showing a configuration of the ultrasonic system 100.

The ultrasonic system 100 includes a signal processing device 1, a transformer Tr, and an ultrasonic transmission reception device 2. The ultrasonic transmission reception device 2 is externally connected to the signal processing device 1 via the transformer Tr. Note that the transformer Tr is not necessarily essential.

The signal processing device 1 is a semiconductor integrated circuit device. The signal processing device 1 includes a DAC (Digital to Analog Converter) 11, a driver 12, an LNA (Low Noise Amplifier) 13, an LPF (Low Pass Filter) 14, an ADC (Analog to Digital Converter) 15, a digital processing unit 16, and external terminals T1 to T5.

The DAC 11 performs digital-to-analog conversion on a wave-transmission signal outputted from a wave-transmission signal generator 161 included in the digital processing unit 16, and outputs the analog signal, resulting from the digital-to-analog conversion, to the driver 12.

A pair of differential output terminals of the driver 12 are connected to a primary side of the transformer Tr via the external terminals T1 and T2. To a secondary side of the transformer Tr, the ultrasonic transmission reception device 2 is connected. The driver 12 drives the ultrasonic transmission reception device 2 based on an output signal of the DAC 11.

The ultrasonic transmission reception device 2 includes an unillustrated piezoelectric element, and performs transmission and reception of an ultrasonic wave. That is, the ultrasonic transmission reception device 2 functions both as a sound source and as a receiver.

A pair of differential input terminals of the LNA 13 are connected to the secondary side of the transformer Tr via the external terminals T3 and T4. An output signal of the LNA 13 is fed via the LPF 14 to the ADC 15. The ADC 15 performs analog-to-digital conversion on the output signal of the LNA 13, and outputs the digital signal, resulting from the analog-to-digital conversion, to a first reflected-wave detection unit 163 and a second reflected-wave detection unit 164, which are included in the digital processing unit 16.

The LNA 13, the LPF 14, and the ADC 15 constitute an example of a wave-reception signal output unit configured to output a wave-reception signal based on wave reception of an ultrasonic wave.

The digital processing unit 16 includes the wave-transmission signal generator 161, a counter 162, the first reflected-wave detection unit 163, the second reflected-wave detection unit 164, a first TOF measurement unit 165, a second TOF measurement unit 166, and an interface 167.

The wave-transmission signal generator 161 is configured to generate a wave-transmission signal for wave transmission of an ultrasonic wave. More specifically, on receiving a wave-transmission command from an unillustrated ECU (Electronic Control Unit) mounted on the vehicle 200 (see FIG. 3) via the interface 167, the wave-transmission signal generator 161 generates a wave-transmission signal including the number of waves, and outputs the wave-transmission signal to the DAC 11. The wave-transmission signal includes a first signal having a first predetermined number of waves (e.g., 32 waves) and a second signal generated after the first signal and having a second predetermined number of waves (e.g., 4 waves), the second predetermined number being smaller than the first predetermined number.

The counter 162 starts a counting operation when the first signal starts to be outputted from the wave-transmission signal generator 161. A count value CV of the counter 162 is transmitted to the first reflected-wave detection unit 163 and the second reflected-wave detection unit 164. The counter 162 transmits, to the first TOF measurement unit 165, a count value indicating the starting time of the output of the first signal as time t1_start at which wave transmission corresponding to the first signal has been started. The counter 162 transmits, to the second TOF measurement unit 166, a count value indicating the starting time of the output of the second signal as time t2_start at which wave transmission corresponding to the second signal has been started.

The first reflected-wave detection unit 163 compares the wave-reception signal outputted from the ADC 15 with a detection threshold value, and thereby detects a reflected wave corresponding to the first signal. The first reflected-wave detection unit 163 detects the reflected wave corresponding to the first signal when no reflected wave has been detected by the second reflected-wave detection unit 164 but the wave-reception signal outputted from the ADC 15 has become equal to or higher than the detection threshold value.

The first reflected-wave detection unit 163 transmits, to the first TOF measurement unit 165, a count value indicating the detection time of the reflected wave corresponding to the first signal as time t1_detect at which the reflected wave corresponding to the first signal has been detected.

The second reflected-wave detection unit 164 compares the wave-reception signal outputted from the ADC 15 with the detection threshold value, and thereby detects a reflected wave corresponding to the second signal. The second reflected-wave detection unit 164 detects the reflected wave corresponding to the second signal in a case where the wave-reception signal outputted from the ADC 15 has become equal to or higher than the detection threshold value before elapse of a first predetermined time period after time t2_start, at which wave transmission corresponding to the second signal has been started, but the time period during which the wave-reception signal outputted from the ADC 15 has been equal to or higher than the detection threshold value is shorter than a second predetermined time period.

The second reflected-wave detection unit 164 transmits, to the second TOF measurement unit 166, a count value indicating the time at which the reflected wave corresponding to the second signal has been detected as time t2_detect at which the reflected wave corresponding to the second signal has been detected.

The first TOF measurement unit 165 calculates a difference between time t1_start and time t1_detect, and measures a TOF of a case where the target object 300 is located far away. The second TOF measurement unit 166 calculates a difference between time t2_start and time t2_detect, and measures a TOF of a case where the target object 300 is located nearby. In this manner, the ultrasonic system 100 is capable of detecting a distance to a target object 300 whether the target object 300 is located nearby or far away.

As has been described above, the first reflected-wave detection unit 163 detects a reflected wave corresponding to the first signal when no reflected wave has been detected by the second reflected-wave detection unit 164 but the wave-reception signal outputted from the ADC 15 has become equal to or higher than the detection threshold value. Accordingly, a determination unit constituted of the first TOF measurement unit 165 and the second TOF measurement unit 166 calculates the difference between time t2_start and time t2_detect to thereby measure a TOF in the case where the reflected wave corresponding to the second signal has been detected by the second reflected-wave detection unit 164, and the determination unit calculates the difference between time t1_start and time t1_detect to thereby measure a TOF in the case where the reflected wave corresponding to the second signal has not been detected by the second reflected-wave detection unit 164 but a reflected wave corresponding to the first signal has been detected by the first reflected-wave detection unit 163. In this manner, it is possible to efficiently measure a correct TOF.

The interface 167 is compliant with LIN (Local Interconnect Network) as an example, and performs communication via the external terminal T5 with the unillustrated ECU mounted on the vehicle 200 (see FIG. 3).

By means of the TOF and the speed of the ultrasonic wave transmitted from the ultrasonic transmission reception device 2, it becomes possible to determine the distance to the target object 300. The results of measurements by the first TOF measurement unit 165 and the second TOF measurement unit 166 are transmitted by the interface 167 to the unillustrated ECU mounted on the vehicle 200 (see FIG. 3).

Figure 5:
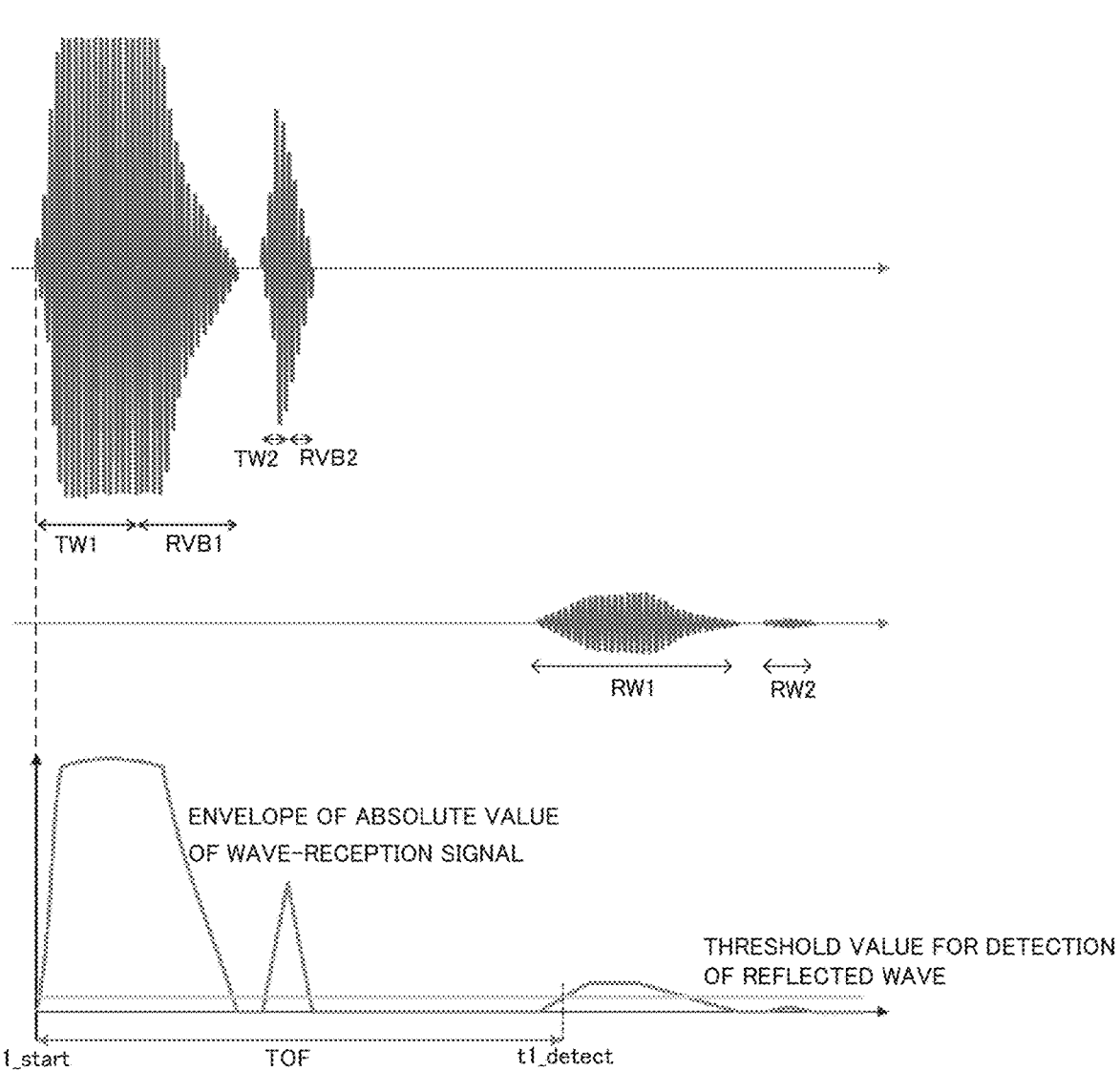
FIG. 5 is a time chart showing wave transmission, reverberation, and wave reception in a case where the target object is located far away.
Figure 6:
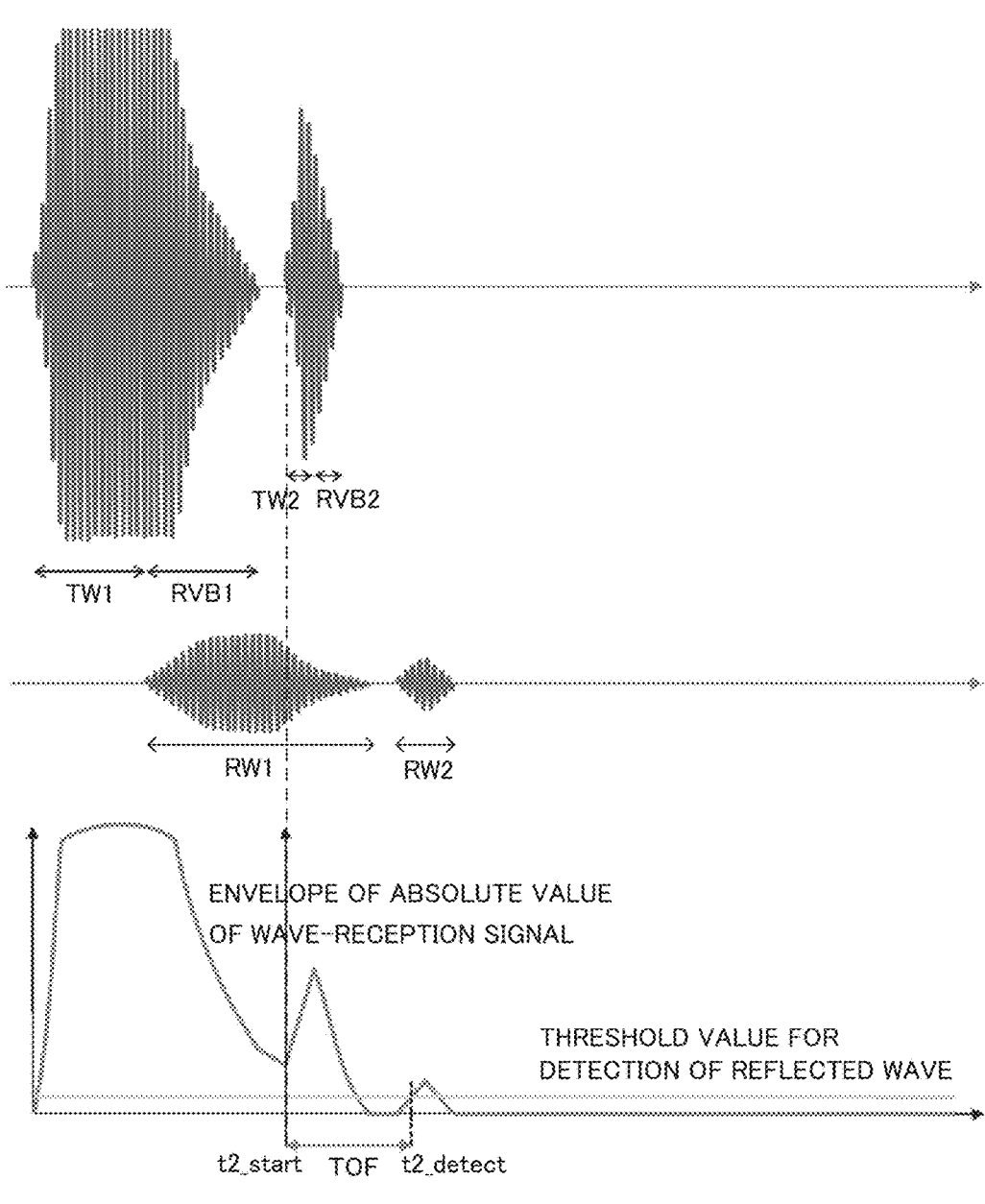
FIG. 6 is a time chart showing wave transmission, reverberation, and wave reception in a case where the target object is located nearby.

FIG. 5 is a time chart showing wave transmission, reverberation, and wave reception in the case where a target object is located far away. FIG. 6 is a time chart showing wave transmission, reverberation, and wave reception in the case where a target object is located nearby.

In FIG. 5 and FIG. 6, wave transmission TW1 is wave transmission corresponding to the first signal. In FIG. 5 and FIG. 6, reverberation RVB1 is reverberation that occurs immediately after the wave transmission TW1. In FIG. 5 and FIG. 6, wave transmission TW2 is wave transmission corresponding to the second signal. In FIG. 5 and FIG. 6, reverberation RVB2 is reverberation that occurs immediately after the wave transmission TW2. In FIG. 5 and FIG. 6, wave reception RW1 is wave reception corresponding to the first signal. In FIG. 5 and FIG. 6, wave reception RW2 is a wave reception corresponding to the second signal.

It is desirable, as shown in FIG. 5 and FIG. 6, that the maximum amplitude of the wave transmission TW1 be larger than that of the wave transmission TW2. This makes it possible to sufficiently secure the power of the wave transmission TW1, allowing the ultrasonic system 100 to more accurately determine a distance to a target object 300 whether the target object 300 is located nearby or far away.

Further, it is desirable that the wave-transmission signal generator 161 be configured to generate the second signal after the reverberation RVB1 following the first signal ends. Note that the ending of the reverberation RVB1 may be confirmed by the wave-transmission signal generator 161 by means of an output of the LNA 13, or, a time at which the reverberation RVB1 can be certainly presumed to have ended through experiments, simulations, etc. may be stored in advance in the wave-transmission signal generator 161. By the second signal being generated after the end of the reverberation RVB1 following the first signal, the ultrasonic system 100 can more accurately determine a distance to a target object 300 whether the target object 300 is located nearby or far away.

Others

Note that the present invention can be implemented with any other configuration than those of the embodiments described above, with various modifications made without departure from the spirit of the present invention. It should be understood that the foregoing embodiments are not limitative but illustrative in every respect. The technical scope of the present invention is not determined by the foregoing embodiments but by the claims, and should be construed to include all modifications equivalent in meaning and scope to the claims.

In the embodiments described above, a reflected wave is detected through comparison between the reflected wave and the detection threshold value, but a reflected wave may be detected through correlation processing.

Figure 7:
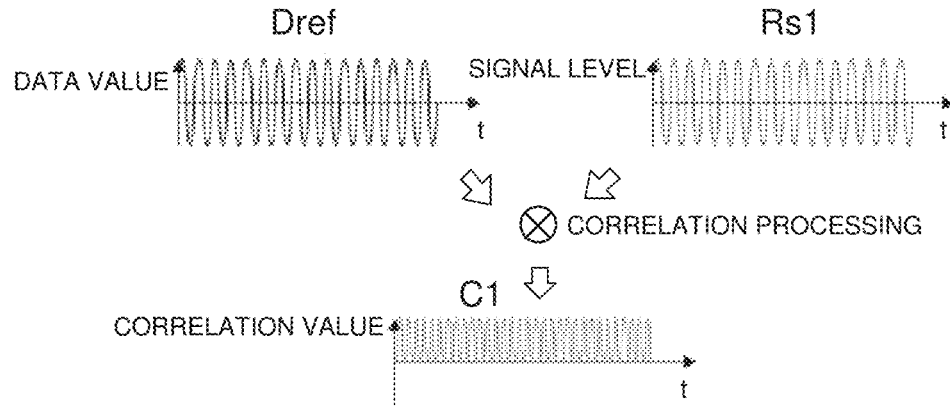
FIG. 7 is a diagram for illustrating an example of correlation processing.

Here, an outline of correlation processing will be described with reference to FIG. 7 and FIG. 8. In FIG. 7, reference data Dref is prepared in advance. The reference data Dref is waveform data of a reflected wave expected to be received, and hence is data of a waveform having the same frequency as a transmitted sound wave. A reflected wave Rs1 shown in FIG. 7 has a frequency identical to that of the transmitted sound wave. Accordingly, in a correlation result C1 obtained by correlation processing in which the reference data Dref and the reflected wave Rs1 are multiplied together, a correlation value is always a positive value as shown in FIG. 7. As a result, a convolution integral value obtained by integrating the correlation result C1 with respect to time is large, so that the reflected wave is emphasized.

Figure 8:
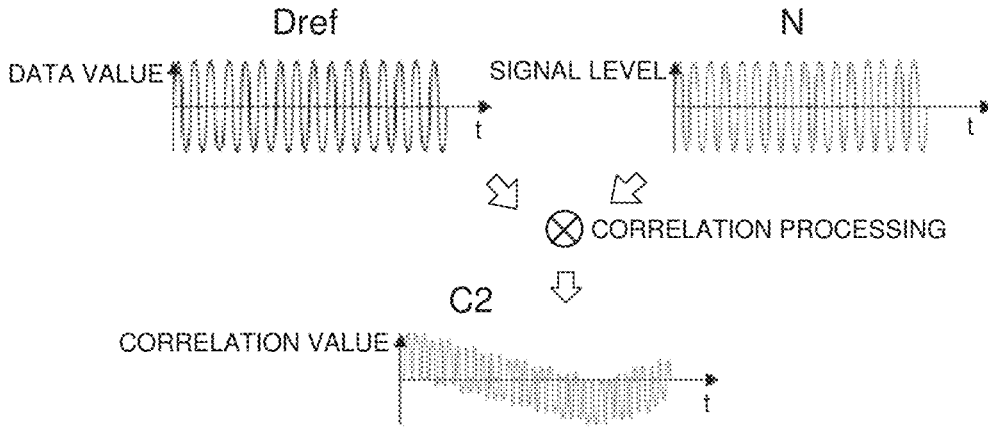
FIG. 8 is a diagram for illustrating an example of correlation processing.

On the other hand, the frequency of received environmental noise N (see FIG. 3) shown in FIG. 8 is deviated from the transmitted wave frequency. That is, the frequency of the environmental noise N deviates from the frequency of the reference data Dref. Thus, as shown in FIG. 8, in a correlation result C2, the correlation value is negative in a period, and as a result, the convolution integral value is smaller than in FIG. 7. In this manner, it is possible to distinguish a reflected wave based on wave transmission from environmental noise.

Figure 9:
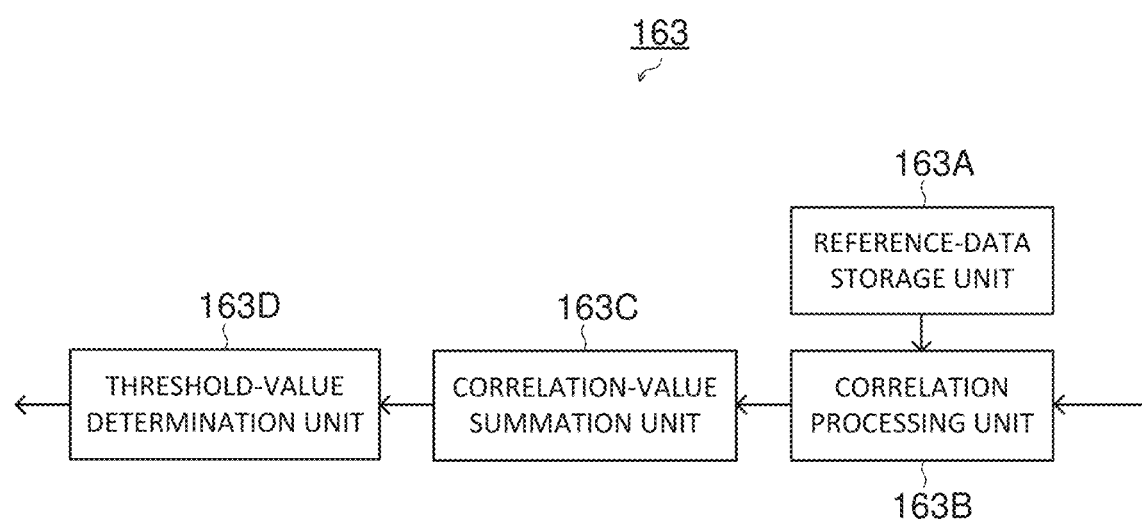
FIG. 9 is a diagram for illustrating an example of a first reflected-wave detection unit.

In a modification where the first reflected-wave detection unit 163 of the ultrasonic system 100 is configured to detect a reflected wave corresponding to the first signal by means of correlation processing, the first reflected-wave detection unit 163 has a configuration as shown in FIG. 9, for example.

The first reflected-wave detection unit 163 of the example shown in FIG. 9 includes a reference-data storage unit 163A, a correlation processing unit 163B, a correlation-value summation unit 163C, and a threshold-value determination unit 163D. The reference-data storage unit 163A is configured to store therein reference data corresponding to the first signal. As the reference-data storage unit 163A, a register can be used, for example.

The correlation processing unit 163B performs correlation processing, at a predetermined cycle, based on the wave-reception signal outputted from the ADC 15 and the reference data stored in the reference-data storage unit 163A.

The correlation-value summation unit 163C sums up results of the correlation processing performed by the correlation processing unit 163B to thereby output a correlation convolution integral value. Note that, as the correlation convolution integral value to be outputted, a calculated result that is a negative value may be truncated to zero.

The threshold-value determination unit 163D compares the correlation convolution integral value with a predetermined threshold value. The threshold-value determination unit 163D detects a reflected wave corresponding to the first signal when the correlation convolution integral value has become larger than the predetermined threshold value.

An example of the second reflected-wave detection unit 164 is similar to the example of the first reflected-wave detection unit 163. However, in the second reflected-wave detection unit 164, reference data corresponding to the second signal is used instead of the reference data corresponding to the first signal.

Note that, by the frequency of the first signal being set different from the frequency of the second signal, it is possible to suppress erroneous TOF measurement in each of the first TOF measurement unit 165 and the second TOF measurement unit 166.

In the above embodiments, the ultrasonic system 100 has been described which transmits an ultrasonic wave (a wave of sound having a vibration frequency higher than audible sound), but the present invention is applicable also to a sound wave system that transmits a sound wave other than an ultrasonic wave.

As described above, a signal processing device (1) includes a wave-transmission signal generator (161) configured to generate a wave-transmission signal for wave transmission of a sound wave, a wave-reception signal output unit (13, 14, 15) configured to output a wave-reception signal based on wave reception of a sound wave, and a reflected-wave detection unit (163, 164) configured to detect, based on the wave-reception signal, a reflected wave of the wave transmission that may be included in the wave reception, and the wave-transmission signal includes a first signal having a first predetermined number of waves and a second signal generated after the first signal and having a second predetermined number of waves, the second predetermined number being smaller than the first predetermined number (a first configuration).

The signal processing device having the above first configuration makes it possible to determine a distance to a target object whether the target object is located nearby or far away. Note that the determination of the distance to the target object may be performed outside the signal processing device or may be performed inside the signal processing device.

In the signal processing device having the above first configuration, a maximum amplitude of wave transmission corresponding to the first signal may be larger than a maximum amplitude of wave transmission corresponding to the second signal (a second configuration).

The signal processing device having the above second configuration more securely makes it possible to determine a distance to a target object whether the target object is located nearby or far away.

In the signal processing device having the above first or second configuration, the wave-transmission signal generator may be configured to generate the second signal after reverberation following the first signal ends (a third configuration).

The signal processing device having the above third configuration more securely makes it possible to determine a distance to a target object whether the target object is located nearby or far away.

The signal processing device according to any one of the above first to third configurations may further include a determination unit, and the determination unit may be configured to determine a time period from the wave transmission corresponding to the second signal until detection of the reflected wave corresponding to the second signal in a case where the reflected wave corresponding to the second signal has been detected by the reflected-wave detection unit, and to determine a time period from the wave transmission corresponding to the first signal until detection of the reflected wave corresponding to the first signal in a case where the reflected wave corresponding to the second signal has not been detected but the reflected wave corresponding to the first signal has been detected by the reflected-wave detection unit (a fourth configuration).

The signal processing device having the above fourth configuration is capable of efficiently measuring a correct TOF.

In the signal processing device having any one of the above first to fourth configurations, the reflected-wave detection unit may be configured to detect, based on a correlation between the wave-reception signal and reference data, a reflected wave of the wave transmission that may be included in the wave reception (a fifth configuration).

The signal processing device having the above fifth configuration is capable of improving robustness against environmental noise.

In the signal processing device having the above fifth configuration, a frequency of the first signal and a frequency of the second signal may be different from each other (a sixth configuration).

The signal processing device having the above sixth configuration is capable of suppressing erroneous measurement of a TOF.

As described above, a sound wave system (100) includes the signal processing device having any one of the above first to sixth configurations, and a sound-wave transmission reception device (2) configured to be directly or indirectly connected to the signal processing device (a seventh configuration).

The sound wave system having the above seventh configuration is capable of determining a distance to a target object whether the target object is located nearby or far away.

As described above, a vehicle (200) includes the sound wave system having the above seventh configuration (an eighth configuration).

The vehicle having the above eighth configuration is capable of making use of a distance to a target object determined by the sound wave system whether the target object is located nearby or far away.

What is claimed is:

1. A signal processing device, comprising:
a wave-transmission signal generator configured to generate a wave-transmission signal for wave transmission of a sound wave;
a wave-reception signal output unit configured to output a wave-reception signal based on wave reception of a sound wave; and
a reflected-wave detection unit configured to detect, based on the wave-reception signal, a reflected wave of the wave transmission included in the wave reception,
wherein the wave-transmission signal includes a first signal having a first predetermined number of waves, and a second signal generated after the first signal and having a second predetermined number of waves, the second predetermined number being smaller than the first predetermined number, and wherein a maximum amplitude of wave transmission corresponding to the first signal is larger than a maximum amplitude of wave transmission corresponding to the second signal.

2. A signal processing device, comprising:
a wave-transmission signal generator configured to generate a wave-transmission signal for wave transmission of a sound wave;
a wave-reception signal output unit configured to output a wave-reception signal based on wave reception of a sound wave; and
a reflected-wave detection unit configured to detect, based on the wave-reception signal, a reflected wave of the wave transmission included in the wave reception,
wherein the wave-transmission signal includes a first signal having a first predetermined number of waves, and a second signal generated after the first signal and having a second predetermined number of waves, the second predetermined number being smaller than the first predetermined number, and
wherein the wave-transmission signal generator is configured to generate the second signal after reverberation following the first signal ends.

3. A signal processing device, comprising:
a wave-transmission signal generator configured to generate a wave-transmission signal for wave transmission of a sound wave;
a wave-reception signal output unit configured to output a wave-reception signal based on wave reception of a sound wave; and
a reflected-wave detection unit configured to detect, based on the wave-reception signal, a reflected wave of the wave transmission included in the wave reception,
wherein the wave-transmission signal includes a first signal having a first predetermined number of waves, and a second signal generated after the first signal and having a second predetermined number of waves, the second predetermined number being smaller than the first predetermined number,
the reflected-wave detection unit is configured to detect, based on a correlation between the wave-reception signal and reference data, a reflected wave of the wave transmission included in the wave reception, and
wherein a frequency of the first signal and a frequency of the second signal are different from each other.

4. A sound wave system, comprising:
the signal processing device according to claim 1; and
a sound-wave transmission reception device configured to be directly or indirectly connected to the signal processing device.

5. A vehicle comprising the sound wave system according to claim 4.

6. A sound wave system, comprising:
the signal processing device according to claim 3; and
a sound-wave transmission reception device configured to be directly or indirectly connected to the signal processing device.

7. A vehicle comprising the sound wave system according to claim 6.

8. A sound wave system, comprising:
the signal processing device according to claim 6; and
a sound-wave transmission reception device configured to be directly or indirectly connected to the signal processing device.

9. A vehicle comprising the sound wave system according to claim 8.

10. The signal processing device according to claim 3, further comprising a determination unit, wherein the determination unit is configured to determine a time period from the wave transmission corresponding to the second signal until detection of the reflected wave corresponding to the second signal in a case where the reflected wave corresponding to the second signal has been detected by the reflected-wave detection unit, and to determine a time period from the wave transmission corresponding to the first signal until detection of the reflected wave corresponding to the first signal in a case where the reflected wave corresponding to the second signal has not been detected but the reflected wave corresponding to the first signal has been detected by the reflected-wave detection unit.

11. A sound wave system, comprising:

the signal processing device according to claim 10; and a sound-wave transmission reception device configured to be directly or indirectly connected to the signal processing device.

12. A vehicle comprising the sound wave system according to claim 11.

* * * * *